United States Patent
Kelber

(10) Patent No.: US 11,330,762 B2
(45) Date of Patent: May 17, 2022

(54) CONTROL SYSTEM FOR A COMBINE HARVESTER UNLOADING AUGER

(71) Applicant: AGCO Corporation, Duluth, GA (US)

(72) Inventor: Christian Roberto Kelber, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 614 days.

(21) Appl. No.: 16/395,384

(22) Filed: Apr. 26, 2019

(65) Prior Publication Data

US 2020/0337236 A1    Oct. 29, 2020

(51) Int. Cl.
| | |
|---|---|
| *A01D 41/12* | (2006.01) |
| *A01F 12/46* | (2006.01) |
| *A01D 41/127* | (2006.01) |
| *A01D 75/28* | (2006.01) |
| *A01F 12/44* | (2006.01) |
| *A01F 12/56* | (2006.01) |

(52) U.S. Cl.
CPC ....... *A01D 41/1217* (2013.01); *A01D 41/127* (2013.01); *A01D 41/1274* (2013.01); *A01F 12/46* (2013.01); *A01D 75/282* (2013.01); *A01F 12/44* (2013.01); *A01F 12/56* (2013.01)

(58) Field of Classification Search
CPC .............. A01D 41/1217; A01D 41/127; A01D 41/1274; A01F 12/46
See application file for complete search history.

(56) References Cited

U.S. PATENT DOCUMENTS

| | | | | |
|---|---|---|---|---|
| 8,868,304 | B2 * | 10/2014 | Bonefas | A01D 41/1217 701/50 |
| 2005/0186997 | A1 | 8/2005 | Ho et al. | |
| 2017/0118914 | A1 | 5/2017 | Bruns et al. | |
| 2018/0317386 | A1 * | 11/2018 | Van Mill | G05B 19/416 |

(Continued)

FOREIGN PATENT DOCUMENTS

| | | | | |
|---|---|---|---|---|
| CA | 2791435 A1 * | 4/2014 | ........ | A01D 41/1217 |
| DE | 195 23 026 A1 | 1/1997 | | |
| EP | 2812791 B1 * | 8/2017 | ........... | G05D 1/0251 |

(Continued)

OTHER PUBLICATIONS

European Patent Office, Search Report for related European Application No. EP 20 16 5705, dated Oct. 15, 2020.

*Primary Examiner* — Thomas B Will
*Assistant Examiner* — Joan D Misa

(57) ABSTRACT

A control system for controlling a motion of an auger tube of a combine harvester comprises a dynamic pre-filter, a position controller, and a speed controller. The dynamic pre-filter receives a desired position value for the auger tube and generates a filtered desired position signal which changes the desired position value from an old value to a new value over a time period. The position controller receives a first difference between the filtered desired position signal and an actual position of the auger tube. The position controller generates a desired angular speed signal that varies according to the first difference. The speed controller receives a second difference between the desired angular speed signal and an actual speed of the auger tube. The speed controller generates an actuator signal that varies according to the second difference and is received by an actuating system that moves the auger tube.

16 Claims, 4 Drawing Sheets

(56) References Cited

U.S. PATENT DOCUMENTS

2020/0337236 A1* 10/2020 Keiber ............... A01D 41/1271

FOREIGN PATENT DOCUMENTS

| EP | 3 298 875 A1 | | 3/2018 | | |
| GB | 2515172 A | * | 12/2014 | ......... | A01D 41/1275 |
| KR | 101659394 B1 | * | 9/2016 | ............ | A01F 12/46 |
| WO | WO-2013120063 A1 | * | 8/2013 | ........... | G05D 1/0251 |

* cited by examiner

CONTROL SYSTEM FOR A COMBINE HARVESTER UNLOADING AUGER

FIELD OF THE INVENTION

Embodiments of the current invention relate to control systems which control a motion of an unloading auger for a combine harvester.

DESCRIPTION OF THE RELATED ART

Combine harvesters are widely used in the agriculture industry to harvest grain-based crops such as wheat. Grain-based crops include stalks that grow from the ground, with each stalk retaining chaff and a plurality of grains. An exemplary combine harvester includes mechanical components that cut the stalks, take in the chaff and grains, and separate the chaff from the grains. The grains are then stored in a bin tank on the combine harvester. The combine harvester further includes an auger tube that empties or unloads the bin tank when it gets full. Usually, the auger tube is stowed within a compartment on the combine harvester and rotated outward away from the compartment when the bin tank is emptied. In some cases, the auger tube may be rotated to various arbitrary angular positions. The combine harvester also includes an actuating system to rotate or move the auger tube. The emptying process may take place when the combine harvester is moving or stationary, on a hill or on flat land, and when the tube is empty or filled. In addition, the actuating system may be utilized with auger tubes of different sizes and lengths. As a result of having to account for changing operational conditions, varying auger tube parameters, and arbitrary angular positions, control of the actuating system is challenging.

SUMMARY OF THE INVENTION

Embodiments of the current invention solve the above-mentioned problems by providing a control system for more effectively controlling a motion of an auger tube. The control system slowly starts moving the auger tube, smoothly accelerates it, and slows the tube down again before it reaches its desired position—which may be any arbitrary angular position. An embodiment of the control system broadly comprises a dynamic pre-filter, a position controller, and a speed controller. The dynamic pre-filter receives a desired position value for the auger tube and generates a filtered desired position signal which changes the desired position value from an old value to a new value over a time period. The position controller receives a first difference between the filtered desired position signal and an actual position of the auger tube. The position controller generates a desired angular speed signal that varies according to the first difference. The speed controller receives a second difference between the desired angular speed signal and an actual speed of the auger tube. The speed controller generates an actuator signal that varies according to the second difference and is received by an actuating system that moves the auger tube.

Another embodiment of the control system broadly comprises a dynamic pre-filter, a position controller, a speed controller, an end-of-stroke protection envelope component, and an anti-windup and limiter component. The dynamic pre-filter receives a desired position value for the auger tube and generates a filtered desired position signal which changes the desired position value from an old value to a new value over a time period. The position controller receives a first difference between the filtered desired position signal and an actual position of the auger tube. The position controller generates a desired angular speed signal that varies according to the first difference. The speed controller receives a second difference between the desired angular speed signal and an actual speed of the auger tube. The speed controller generates an actuator signal that varies according to the second difference and is received by an actuating system that moves the auger tube. The end-of-stroke protection envelope component receives the actual position of the auger tube and generates a waveform envelope to be applied to the actuator signal that reduces the speed of the auger tube as the auger tube nears its desired position value—in case the speed controller experiences a failure to slow the auger tube down or if the speed controller is improperly configured. The anti-windup and limiter component receives the actuator signal and limits the levels or values of the actuator signal if the levels or values exceed maximum levels or values—in order to provide protection for the control system.

Yet another embodiment of the current invention provides a combine harvester configured to cut and retain grain from a crop. The combine harvester broadly comprises an auger tube, an actuating system, and a control system. The auger tube is used for unloading grain from the combine harvester and is rotatably movable from an old desired position to a new desired position. The actuating system moves the auger tube.

The control system communicates with the actuating system and controls the motion of the auger tube. The control system comprises a dynamic pre-filter, a position controller, and a speed controller. The dynamic pre-filter receives a desired position value for the auger tube and generates a filtered desired position signal which changes the desired position value from an old value to a new value over a time period. The position controller receives a first difference between the filtered desired position signal and an actual position of the auger tube. The position controller generates a desired angular speed signal that varies according to the first difference. The speed controller receives a second difference between the desired angular speed signal and an actual speed of the auger tube. The speed controller generates an actuator signal that varies according to the second difference and is received by an actuating system that moves the auger tube.

BRIEF DESCRIPTION OF THE DRAWING FIGURES

Embodiments of the current invention are described in detail below with reference to the attached drawing figures, wherein.

Figure 1:
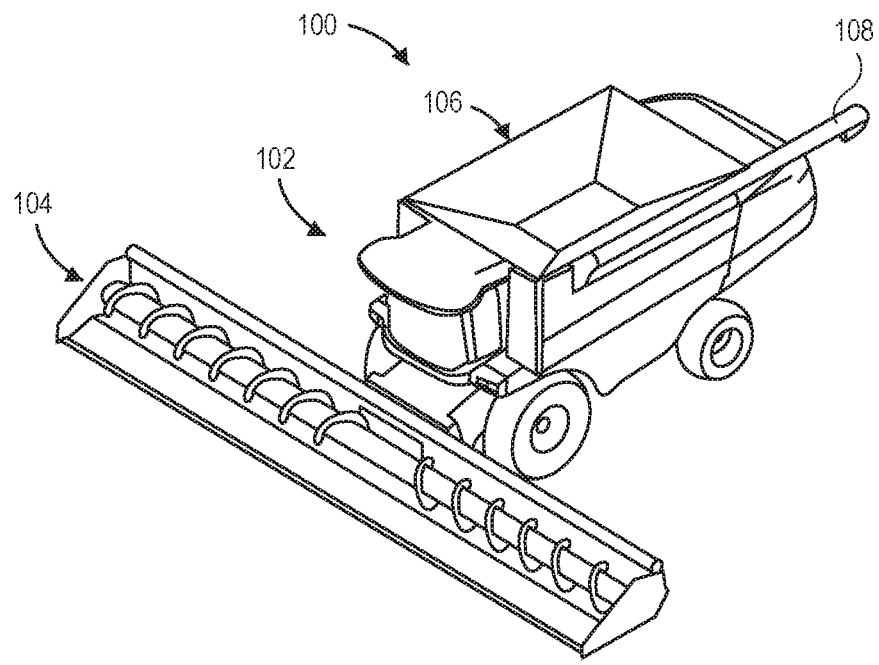
FIG. 1 is a perspective view of a combine harvester including a ground driving and steering unit, a header, a bin tank, and an auger tube in a stowed position.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Figure 2:
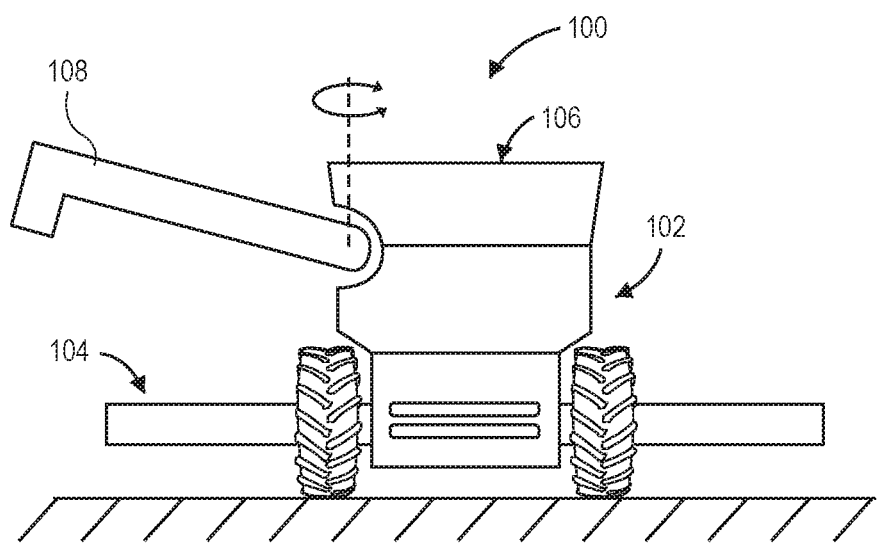
FIG. 2 is a rear view of the combine harvester with the auger tube in a rotated position for unloading grain.
Figure 3:
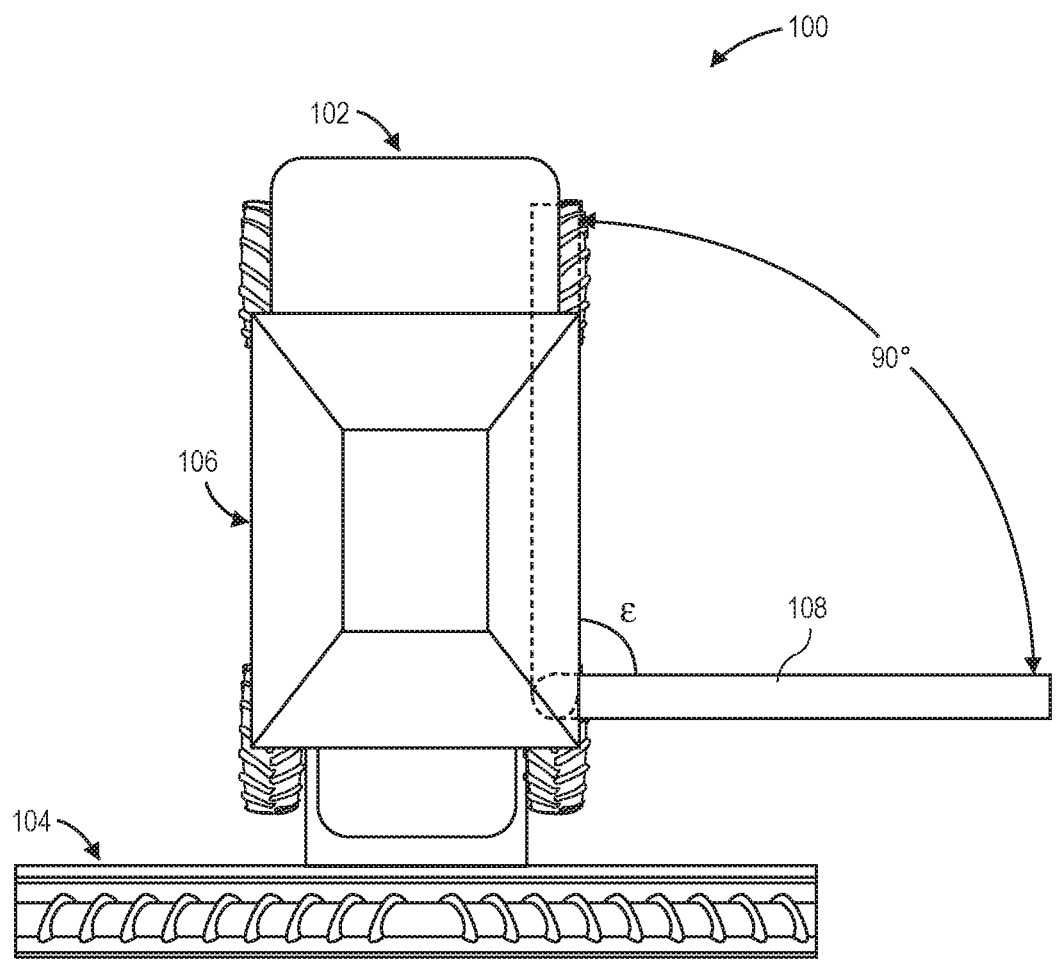
FIG. 3 is a top view of the combine harvester with the auger tube in the rotated position, illustrating a path of travel and an angle of travel.
Figure 4:
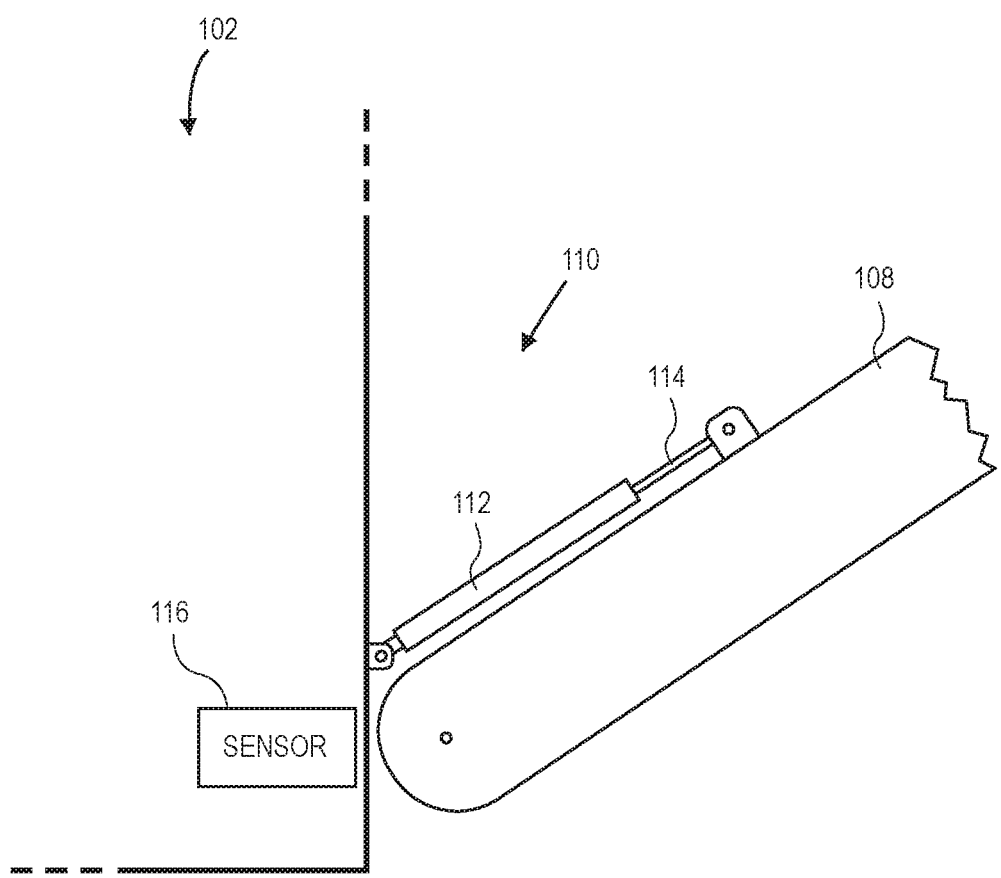
FIG. 4 is a top view of a fragment of the ground driving and steering unit, a fragment of the auger tube, a sensor for measuring the travel of the auger tube, and an actuator for rotating the auger tube.
Figure 5:
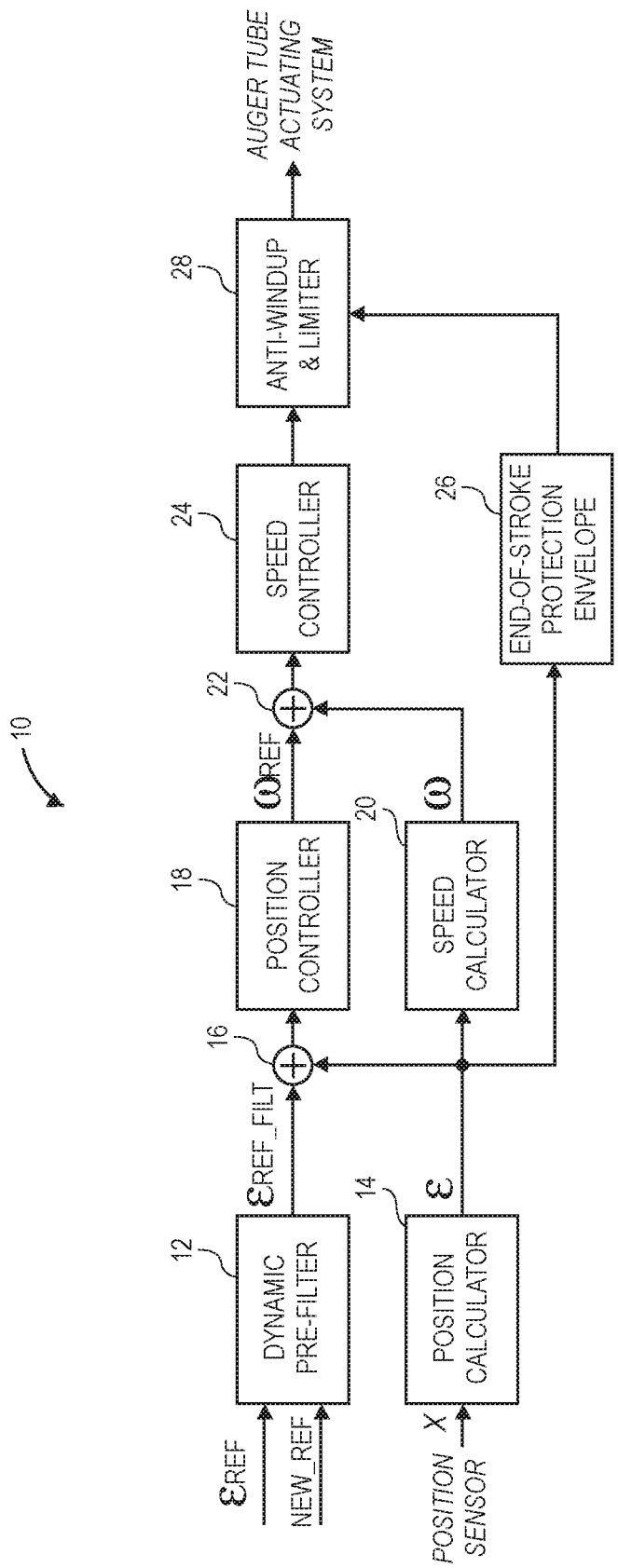
FIG. 5 is a schematic block diagram of a control system, constructed in accordance with various embodiments of the current invention, for controlling the motion of the actuator.

Referring to FIGS. 1-3, a combine harvester 100 that interfaces with aspects of the current invention is shown. The combine harvester 100 may include a ground driving and steering unit 102, a header 104, a bin tank 106, and an auger tube 108. Referring to FIG. 4, the combine harvester 100 may further include an actuating system 110 for moving the auger tube 108. Referring to FIG. 5, the combine harvester 100 also includes a control system 10, constructed in accordance with various embodiments of the current invention, for controlling the actuating system 110 while it moves the auger tube 108.

The ground driving and steering unit 102 provides propulsion and guidance for the combine harvester 100. The ground driving and steering unit 102 includes a cabin in which an operator sits. The cabin may include a console with a display to monitor the operation of the combine harvester 100 and one or more control panels to control the operation of the header 104 and the auger tube 108, among other components. The ground driving and steering unit 102 may further include a compartment in which the auger tube 108 is stowed.

The header 104 cuts and takes in the grain and chaff of the crop. The header 104 may include cutters to cut the stalk and one or more rotating augers or belts that take in the grain and chaff. The header 104 may be specifically designed to work with a particular crop. Thus, the operator may have a plurality of crop-specific headers, one of which may be utilized to harvest a particular crop.

The bin tank 106 stores the grains after they have been separated from the chaff. Typically, the combine harvester 100 includes a threshing mechanism (not shown in the figures) which separates the grains from the chaff. The separated grains may be transported by conveyor or the like to the bin tank 106.

The auger tube 108 provides a component for unloading the grain and/or emptying the bin tank 106. The auger tube 108 may include a hollow cylinder with a first end that receives grains from the bin tank 106 and an opposing second end including a chute or spout through which the grains are ejected from the auger tube 108. The auger tube 108 further includes a helical screw blade or threaded auger positioned within the hollow cylinder and operable to rotate in order to transport the grains from the first end of the hollow cylinder to the second end.

The actuating system 110 moves the auger tube 108 from one position to another, such as from a stowed position within the compartment to an unloading position for dispensing the grains and vice-versa. The actuating system 110 may include an actuating mechanism with a housing 112 and an actuator arm 114. The housing 112 is generally tubular with a first end rotatably coupled to a wall of the ground driving and steering unit 102 and an opposing second end. The actuator arm 114 is retained within the housing 112 and is extended from, and retracted into, the second end of the housing 112. Generally, extension of the actuator arm 114 moves the auger tube 108 from the stowed position to the unloading position, while retraction of the actuator arm 114 moves the auger tube 108 from the unloading position to the stowed position. The actuating system 110 may include hydraulic components, pneumatic components, electric motor components, or the like which extend and retract the actuator arm 114. The actuating system 110 may receive a control signal or control data from the control system 10 which instruct the actuating mechanism to extend or retract the actuator arm 114.

The actuating system 110 may further include a position sensor 116 which determines or measures a positional characteristic of the actuator arm 114, such as the extension of the actuator arm 114—from which an angular position of the auger tube 108 can be derived or calculated. The position sensor 116 communicates the position information of the actuator arm 114 as an electronic signal or digital data to the control system 10.

Referring to FIG. 5, the control system 10 controls the motion of the auger tube 108 once a command to move the auger tube 108 has been given. The control system 10 utilizes a cascade controller architecture with a position controller generating a setpoint for a speed controller which generates a signal that operates the actuating system 110. Other architectures or types of controllers may be utilized. The control system 10 includes a dynamic pre-filter 12, a position calculator 14, a first signal adder 16, a position controller 18, a speed calculator 20, a second signal adder 22, a speed controller 24, an end-of-stroke protection envelope component 26, and an anti-windup and limiter component 28. The control system 10 may be implemented in hardware, software, firmware, or combinations thereof. For example, the control system 10 may comprise one or more processors or may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The control system 10 may further include electronic components such as signal filters, signal amplifiers, analog-to-digital converters (ADCs), digital-to-analog converters (DACs), and so forth. Alternatively, or additionally, each listed component of the control system 10 may be a block of executable computer code, such as a function or part of a library, so that the components operate together as a software application or program.

The control system 10 receives information about an angular position value of the auger tube 108, which is generally denoted as epsilon ($\varepsilon$), as shown in FIG. 3. The position value $\varepsilon$ may be given in units of degrees, such as 45 degrees, or radians, such as $\pi/8$ (0.39) radians. A frame of reference for the position value $\varepsilon$ may be that the stowed position for the auger tube 108 is 0 degrees, while a position of the auger tube 108 away from the ground driving and steering unit 102 is a positive angle greater than 0 degrees. For example, the position value $\varepsilon$ of the auger tube 108 as shown in FIG. 3 is approximately 90 degrees.

The control system 10 receives a desired position value $\varepsilon_{ref}$ from a cabin console system operated by the combine harvester 100 operator/driver. The desired position value $\varepsilon_{ref}$ is the angular value where the auger tube 108 is supposed to be located. The control system 10 also receives the position information of the actuator arm 114 from the position sensor 116, which is converted to an actual position value x, as discussed below.

The dynamic pre-filter 12 receives the desired position value $\varepsilon_{ref}$ and provides gradual adjustment of the desired position value $\varepsilon_{ref}$ when a new desired position value $\varepsilon_{ref}$ is entered by the combine harvester 100 operator. The dynamic pre-filter 12 also receives a "new_ref" signal, which is simply an impulse signal to alert the control system 10, and the dynamic pre-filter 12 in particular, that a new desired position value $\varepsilon_{ref}$ has been entered. The dynamic pre-filter 12 utilizes a second-order equation, EQ. 1 as shown below, to implement a filter function to slow down or "soften" the abrupt transition of the desired position value $\varepsilon_{ref}$ from the old value to the new value.

$$\frac{1}{\varphi_0^2}\frac{d^2 y(t)}{dt^2} + \frac{2D}{\varphi_0}\frac{dy(t)}{dt} + y(t) = K \cdot u(t) \qquad \text{EQ. 1}$$

The dynamic pre-filter 12 provides no amplification of the input (desired position value $\varepsilon$ref), and no overshoot of the output is desired, so K=1 and D=1. Solving equation EQ. 1 will produce the roots: s1=s2=$-\varphi_0$, wherein $\varphi_0$ is the filter cutoff frequency. Applying a unitary step function to the input, the step response h(t) of the dynamic pre-filter 12 becomes the equation EQ. 2 shown below.

$$h(t) = 1 - e^{-\varphi_0 t} - \varphi_0 t \times e^{-\varphi_0 t} \qquad \text{EQ. 2}$$

Typically, the cutoff frequency $\varphi_0$ in EQ. 2 is a constant, having a fixed value—although different values may be selected which result in performance variations of the transition of the desired position value $\varepsilon_{ref}$ from the old value to the new value. Some values of the cutoff frequency $\varphi_0$ result in the desired position value $\varepsilon_{ref}$ smoothly changing from the old value but slowly arriving at the new value. Other values of the cutoff frequency $\varphi_0$ result in the desired position value $\varepsilon_{ref}$ smoothly arriving at the new value but changing too quickly from the old value. No constant value of the cutoff frequency $\varphi_0$ provides the optimal performance of smoothly changing from the old desired position value $\varepsilon_{ref}$, quickly rising, and smoothly arriving at the new desired position value $\varepsilon_{ref}$. In order to provide the optimal performance, the cutoff frequency $\varphi_0$ is chosen to be a variable, as defined in EQ. 3 below.

$$\varphi(t) = \begin{cases} \varphi_{min} + a \cdot t; 0 < t < t_{max} \\ \varphi_{max}; t > t_{max} \end{cases} \qquad \text{EQ. 3}$$

The values of $\varphi_{min}$ and $\varphi_{max}$ are chosen to provide optimal performance, and the value of $t_{max}$ is the time period during which the transition from the old desired position value $\varepsilon_{ref}$ to the new desired position value $\varepsilon_{ref}$ occurs. The substitution of $\varphi(t)$ from EQ. 3 into $\varphi_0$ from EQ. 2 provides the optimal performance of smoothly changing from the old desired position value $\varepsilon_{ref}$, quickly rising, and smoothly arriving at the new desired position value $\varepsilon_{ref}$. The output of the dynamic pre-filter 12 is the filtered desired position signal $\varepsilon_{ref\_filt}$.

The position calculator 14 receives position information from the position sensor 116 regarding the actuator arm 114. Ideally, the position sensor 116 would be located on the auger tube 108 and would be able to automatically report the angular position of the auger tube 108. But, in situations where the position sensor 116 cannot provide the angular position of the auger tube 108, the position calculator 14 is necessary. The position information, x, received from the position sensor 116 may indicate a quantity such as a length of extension of the actuator arm 114 out of the housing 112, as shown in FIG. 4. Other quantities are possible. The position calculator 14 computes the angular position, $\varepsilon$, of the auger tube 108 using geometrical and other mathematical relationships. In various embodiments, the auger tube 108 may move not only in the XY plane, as shown in FIG. 3, also in the third dimension along the Z-axis—that is, up and down. In such embodiments, the calculation of actual position value $\varepsilon$ also includes the projection of the Z-axis motion onto the XY plane, such that $\varepsilon$ is the position of the auger tube 108 only in the XY plane.

The first signal adder 16 receives two signals as inputs and generates an output signal that is the sum of the two inputs. Typically, the first signal adder 16 inverts the second input such that the output is the first signal minus the second signal. The first signal adder 16 may include analog and/or digital signal adding components. The first signal adder 16 receives the filtered desired position signal $\varepsilon_{ref\_filt}$ and the actual position value $\varepsilon$ as inputs and generates a first difference signal which is the filtered desired position signal $\varepsilon_{ref\_filt}$ minus the actual position value $\varepsilon$.

The position controller 18 generates a desired angular speed signal $\omega_{ref}$ that serves as a set point for the speed controller 24. The position controller 18 receives the first difference signal from the first signal adder 16. The position controller 18 may include or utilize any type of control components such as proportional (P), derivative (D), or integral (I), or combinations thereof PD, PI, or PID. The position controller generates the desired angular speed signal $\omega_{ref}$ of the auger tube 108 while it is being moved based on, and/or varying according to, the difference between the desired position of the auger tube 108 and its actual position (also known as the position error).

The speed calculator 20 determines and generates an actual speed $\omega$ of the auger tube 108. The speed calculator 20 receives the actual position value $\varepsilon$ of the auger tube 108 from the position calculator 14. Since speed is the time derivative of a change in position, the speed calculator 20 includes electronic circuitry or components that calculate a derivative of a signal. Specifically, the speed calculator 20 calculates the derivative of the actual position value $\varepsilon$ and outputs the derivative as the actual speed $\omega$.

The second signal adder 22 is substantially similar to the first signal adder 16 in structure and operation. The second signal adder 22 receives the desired angular speed signal $\omega_{ref}$ and the actual speed $\omega$ as inputs and generates a second difference signal which is the desired angular speed $\omega_{ref}$ minus the actual speed $\omega$.

The speed controller 24 generates an actuator signal that is ultimately received by the actuating system 110. The speed controller 24 receives the second difference signal from the second signal adder. The speed controller 24 may include or utilize any type of control components such as proportional, derivative, or integral, or combinations thereof PD, PI, or PID. The speed controller generates the actuator signal, which includes the appropriate signal levels and/or data for the actuating system 110 to move the auger tube 108 at the desired speed from the old desired position value $\varepsilon_{ref}$ to the new desired position value $\varepsilon_{ref}$, the actuator signal being based on, and/or varying according to, the difference between the desired speed of the auger tube 108 and its actual speed (also known as the speed error).

The end-of-stroke protection envelope component 26 provides a final stop for movement of the auger tube 108 in the event that the speed controller 24 does not adequately slow the auger tube 108 down as it is nearing the new desired position value $\varepsilon_{ref}$, which is the "end of stroke". The end-of-stroke protection envelope component 26 receives the actual position value $\varepsilon$ from the position calculator 14. The end-of-stroke protection envelope component 26 may also receive the new desired position value $\varepsilon_{ref}$ from the cabin console system so it can determine how close the auger tube 108 is to the end of its stroke—which is the new desired position value $\varepsilon_{ref}$. The end-of-stroke protection envelope component 26 generates an envelope signal which includes a waveform envelope that may be applied to the actuator signal from the speed controller 24. The envelope reduces the amplitude of the actuator signal based on, and/or according to, the position of the auger tube 108, particularly as the auger tube 108 nears its destination—the new desired position value $\varepsilon_{ref}$. The envelope may be applied if the speed controller 24 has not reduced the speed of the auger tube 108 sufficiently near the end of stroke.

The anti-windup and limiter component 28 provides final processing or conditioning of the actuator signal before the actuator signal is communicated to the actuating system 110. The anti-windup and limiter component 28 receives the actuator signal from the speed controller 24 and monitors its levels or values to determine whether the levels or values of the actuator signal exceed a maximum level or value. This situation may occur if the speed controller 24 includes an integral or integrating component, which integrates the second difference signal in order to generate at least a portion of the actuator signal and may contribute to the levels or values of the actuator signal exceeding the maximum. If the levels or values of the actuator signal exceed the maximum level or value, then the anti-windup and limiter component 28 adjusts the levels or values of the actuator signal to the maximum. The anti-windup and limiter component 28 may also communicate with the position controller 18 and the speed controller 24 to prevent any integral or integrating components from continuing to integrate the difference signals if the levels or values of the actuator signal exceed the maximum level or value. The anti-windup and limiter component 28 also receives the envelope signal from the end-of-stroke protection envelope component 26 and may apply the waveform envelope to the actuator signal before the actuator signal is communicated to the actuating system 110.

The control system 10 may operate as follows. The operator of the combine harvester 100 wants to move the auger tube 108 in order to begin unloading or to return the auger tube 108 to a stowed position after unloading has finished. The operator enters the new position for the auger tube 108 into the console, which communicates the new desired position value $\varepsilon_{ref}$ to the control system 10. The console may also communicate the new_ref signal, or the new_ref signal may be generated as a result of the change in the desired position value $\varepsilon_{ref}$. The dynamic pre-filter 12 receives the new desired position value $\varepsilon_{ref}$ and the new_ref signal. The dynamic pre-filter 12 upon receiving the new-ref signal slowly changes, over the time period $t_{max}$, the desired position value $\varepsilon_{ref}$ from its previous value to the new value and outputs the change as the filtered desired position signal $\varepsilon_{ref\_filt}$.

The position calculator 14 receives actuator arm 114 position information from the position sensor 116 and converts it to the actual position value $\varepsilon$ of the auger tube 108. The position controller 18 receives the first difference signal which includes the position error of the auger tube 108 and generates a desired speed $\omega_{ref}$ for the auger tube 108 that is based on, and varies according to, the position error. Generally, the greater the position error, the greater the speed. And, after a new position for the auger tube 108 is received from the console, the position error should be at its maximum, resulting in a corresponding maximum speed. But, due to the performance of the dynamic pre-filter 12, the new desired position value $\varepsilon_{ref}$ is changed slowly, thus, gradually increasing the position error, which in turn, gradually increases the desired speed $\omega_{ref}$ signal.

The speed calculator 20 calculates the actual speed $\omega$ of the auger tube 108 as the time derivative of the position of the auger tube 108. The speed controller 24 receives the second difference signal which includes the speed error of the auger tube 108 and generates the actuator signal that is based on, and varies according to, the speed error. The actuator signal is received by the anti-windup and limiter component 28, which may limit the amplitude of the actuator signal if the anti-windup and limiter component 28 determines that the speed controller 24 is trying generate levels or values in the actuator signal that are beyond what the actuating system 110 can handle. In addition, the anti-windup and limiter component 28 may apply an envelope (received from the end-of-stroke protection envelope component 26) to the actuator signal in order to slow down the auger tube 108 as it approaches the new desired position value $\varepsilon_{ref}$ in order to provide protection if the auger tube 108 is approaching the end of stroke at a speed that exceeds safe limits.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A control system for controlling a motion of an auger tube of a combine harvester, the control system comprising:
 a dynamic pre-filter configured to receive a desired position value for the auger tube and to generate a filtered desired position signal which changes the desired position value from an old value to a new value over a time period;
 a position controller receiving a first difference between the filtered desired position signal and an actual position of the auger tube, the position controller configured to generate a desired angular speed signal that varies according to the first difference; and
 a speed controller receiving a second difference between the desired angular speed signal and an actual speed of the auger tube, the speed controller configured to generate an actuator signal that varies according to the second difference, the actuator signal to be received by an actuating system that moves the auger tube.

2. The control system of claim 1, further comprising an anti-windup and limiter component receiving the actuator signal and configured to limit the levels or values of the actuator signal if the levels or values exceed maximum levels or values.

3. The control system of claim 1, further comprising an end-of-stroke protection envelope component receiving the actual position of the auger tube and configured to generate a waveform envelope to be applied to the actuator signal to reduce the speed of the auger tube as the auger tube nears its desired position value if the speed controller does not reduce the speed of the auger tube as it approaches the desired position value.

4. The control system of claim 1, further comprising a position calculator configured to receive position information regarding the actuating system and calculate the actual position of the auger tube.

5. The control system of claim 1, further comprising a speed calculator configured to receive the actual position of the auger tube and calculate the actual speed of the auger tube as a time derivative of the actual position.

6. The control system of claim 1, further comprising
 a first signal adder configured to receive the filtered desired position signal and the actual position of the auger tube and generate the first difference, and
 a second signal adder configured to receive the desired angular speed signal and the actual speed of the auger tube and generate the second difference.

7. A control system for controlling a motion of an auger tube of a combine harvester, the control system comprising:
 a dynamic pre-filter configured to receive a desired position value for the auger tube and to generate a filtered desired position signal which changes the desired position value from an old value to a new value over a time period;
 a position controller receiving a first difference between the filtered desired position signal and an actual position of the auger tube, the position controller configured to generate a desired angular speed signal that varies according to the first difference;
 a speed controller receiving a second difference between the desired angular speed signal and an actual speed of the auger tube, the speed controller configured to generate an actuator signal that varies according to the second difference, the actuator signal to be utilized by an actuating system that moves the auger tube;
 an end-of-stroke protection envelope component receiving the actual position of the auger tube and configured to generate a waveform envelope to be applied to the actuator signal to reduce the speed of the auger tube as the auger tube nears its desired position value if the speed controller does not reduce the speed of the auger tube as it approaches the desired position value; and
 an anti-windup and limiter component receiving the actuator signal and configured to limit the levels or values of the actuator signal if the levels or values exceed maximum levels or values.

8. The control system of claim 7, further comprising a position calculator configured to receive position information regarding the actuating system and calculate the actual position of the auger tube.

9. The control system of claim 7, further comprising a speed calculator configured to receive the actual position of the auger tube and calculate the actual speed of the auger tube as a time derivative of the actual position.

10. The control system of claim 7, further comprising
 a first signal adder configured to receive the filtered desired position signal and the actual position of the auger tube and generate the first difference, and
 a second signal adder configured to receive the desired angular speed signal and the actual speed of the auger tube and generate the second difference.

11. A combine harvester configured to cut and retain grain from a crop, the combine harvester comprising:
 an auger tube for unloading grain from the combine harvester, the auger tube rotatably movable from an old desired position to a new desired position;
 an actuating system configured to move the auger tube; and
 a control system configured to communicate with the actuating system and control the motion of the auger tube, the control system comprising:
  a dynamic pre-filter configured to receive a desired position value for the auger tube from a console and to generate a filtered desired position signal which changes the desired position value from an old value to a new value over a time period;
  a position controller receiving a first difference between the filtered desired position signal and an actual position of the auger tube, the position controller configured to generate a desired angular speed signal that varies according to the first difference; and
  a speed controller receiving a second difference between the desired angular speed signal and an actual speed of the auger tube, the speed controller configured to generate an actuator signal that varies according to the second difference, the actuator signal to be received by the actuating system.

12. The combine harvester of claim 11, wherein the control system further comprises an anti-windup and limiter component receiving the actuator signal and configured to limit the levels or values of the actuator signal if the levels or values exceed maximum levels or values.

13. The combine harvester of claim 11, wherein the control system further comprises an end-of-stroke protection envelope component receiving the actual position of the auger tube and configured to generate a waveform envelope to be applied to the actuator signal to reduce the speed of the auger tube as the auger tube nears its desired position value if the speed controller does not reduce the speed of the auger tube as it approaches the desired position value.

14. The combine harvester of claim 11, wherein the control system further comprises a position calculator configured to receive position information regarding the actuating system and calculate the actual position of the auger tube.

15. The combine harvester of claim 11, wherein the control system further comprises a speed calculator configured to receive the actual position of the auger tube and calculate the actual speed of the auger tube as a time derivative of the actual position.

16. The combine harvester of claim 11, wherein the control system further comprises
- a first signal adder configured to receive the filtered desired position signal and the actual position of the auger tube and generate the first difference, and
- a second signal adder configured to receive the desired angular speed signal and the actual speed of the auger tube and generate the second difference.

* * * * *